_United States Patent Office_

3,151,148
Patented Sept. 29, 1964

3,151,148
CYANO STILBENE HYPOCHOLESTEROLEMIC AGENTS
George M. K. Hughes, Gales Ferry, Conn., assignor to Chas. Pfizer & Co., Inc., New York, N.Y., a corporation of Delaware
No Drawing. Filed Sept. 6, 1961, Ser. No. 136,178
5 Claims. (Cl. 260—465)

The present invention relates to new chemical compounds of the cyanostilbene series. They are useful in decreasing blood cholesterol levels.

More particularly, the compounds of the present invention correspond to the formulae:

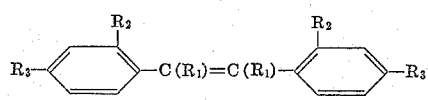

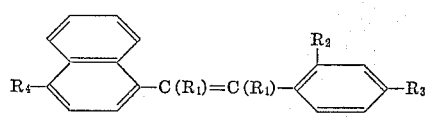

and

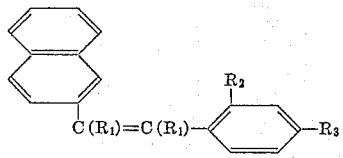

wherein $R_1$ is selected from the group consisting of hydrogen, cyano, phenyl and alkyl having from one to four carbon atoms, one $R_1$ being cyano;

$R_2$ is selected from the group consisting of hydrogen and halo, at least one $R_2$ in the diphenyl compound being hydrogen;

$R_3$ is selected from the group consisting of hydrogen, trifluoromethyl, halo, nitro, lower-alkyl, lower-alkoxy, hydroxy - (lower) - alkoxy, aryl - (lower)-alkylmercapto, lower-alkylmercapto, di-(lower)-alkylamino, and tertiary-aminoalkoxy having from two to four carbon atoms in the straight chain and up to a total of eight carbon atoms, at least one $R_3$ being tertiary-aminoalkoxy;

$R_4$ is selected from the group consisting of hydrogen, trifluoromethyl and halo; and The pharmaceutically acceptable acid addition salts thereof.

In this specification and in the claims, the term "tertiary-aminoalkoxy" is to be considered as covering radicals corresponding to the following formula:

$$-OAlk-N\begin{matrix}R_4\\R_6\end{matrix}$$

In the above formula, Alk is a lower alkylene chain containing 2 to 4 carbon atoms in the straight chain and up to a total of eight carbon atoms. $R_5$ and $R_6$ are each lower alkyl or when taken together with the nitrogen atom are pyrrolidino, piperidino, or morpholino. When the terms lower-alkyl and lower-alkoxy are employed in this specification and in the claims, they are defined as containing from one to four carbon atoms.

Atherosclerosis is associated with high cholesterol levels in the blood stream. Various methods have been suggested for alleviating this condition. It has been discovered that oral or parenteral administration to a host of a compound of the present invention will significantly decrease the blood cholesterol level.

A number of experiments have been carried out to show the hypocholesterolemic effect of the agents of this invention. In these experiments, normal rats, dogs and monkeys were treated either orally or subcutaneously with the selected compound and treatment was continued for a period of days on the chosen dosage schedule. At the end of this period, the sera of the animals was analyzed by a colorimetric method, for cholesterol. In the rat experiments these results were compared with the sera of controls which were on the same diet and were similarly treated in all respects except that they did not receive an active agent of this invention. For the monkeys and dogs employed in this experiment the same animals were used as controls. That is, cholesterol levels were determined before the administration of the compounds of this invention and these levels were employed as the controls when the animals were treated with the heretofore described compounds. It was found that the cholesterol level of the sera of the treated animals were significantly lower than the cholesterol levels of the controls. The following table shows some of these results. Similar results are obtained with other compounds within the scope of the invention at various dosage levels.

TABLE I

| Compound | Species—No. of Animals | Dose (mg./kg.) | Duration (Days) | Percent Reduction of Cholesterol Level |
|---|---|---|---|---|
| α-(p-diethylamino-ethoxyphenyl)-β-(p-methylthiophenyl) acrylonitrile hydrochloride. | Rat—11 | 70 | 6 | 51. |
|  | Rat—27 | 40 | 6 | 41. |
|  | Rat—6 | 20 | 6 | 30. |
|  | Rat—11 | 10 | 6 | 26. |
|  | Dog—2 | 25 for first 7 days; then 15 for the next 14 days. |  | 18 (7 days). 22 (14 days). 24 (21 days). |
| α-(p-diethylamino-ethoxyphenyl)-β-(p-diethylamino-ethoxyphenyl) acrylonitrile dihydrochloride. | Rat—6 | 70 | 6 | 45. |
|  | Rat—28 | 40 | 6 | 48. |
|  | Rat—6 | 20 | 6 | 37. |
|  | Rat—12 | 10 | 6 | 31. |
|  | Dog—2 | 50 for the first two days; then 25 for next 19 days. |  | 12 (7 days). 13 (14 days). 7 (21 days). |
| β-(p-diethylaminoethoxyphenyl)-α-phenyl-α-pentenonitrile hydrochloride. | Rat—11 | 40 | 6 | 50. |
|  | Rat—5 | 20 | 6 | 43. |
|  | Rat—6 | 10 | 6 | 8. |
|  | Dog—2 | 25 for first 7 days; then 25 for next 19 days. |  | 27 (7 days). 33 (14 days). 30 (21 days). |
|  | Dog—4 | 15 | 21 | 20 (7 days). 22 (14 days). 31 (21 days). |
|  | Monkey—2 | 15 | 28 | 15 (14 days). 38 (21 days). |

TABLE 1—Continued

| Compound | Species—No. of Animals | Dose (mg./kg.) | Duration (Days) | Percent Reduction of Cholesterol Level |
|---|---|---|---|---|
| α-(p-chlorophenyl)-β-(p-diethylaminoethoxyphenyl)-α-pentenonitrile hydrochloride. | Rat—6<br>Rat—6<br>Rat—6 | 40<br>20<br>10 | 6<br>6<br>6 | 79.<br>64.<br>50. |
| α-(p-diethylaminoethoxyphenyl)-β-phenyl-α-pentenonitrile hydrochloride. | Rat—5<br>Rat—6<br>Rat—6 | 40<br>20<br>10 | 6<br>6<br>6 | 74.<br>33.<br>15. |
| α-(p-diethylamino-ethoxyphenyl)-β-(p-chlorophenyl)-α-pentenonitrile hydrochloride. | Rat—5 | 40 | 6 | 73. |
| α-(p-fluorophenyl)-β-(diethylaminoethoxyphenyl)-α-pentenonitrile hydrochloride. | Rat—6 | 40 | 6 | 77. |

The compounds of this invention may be prepared in accordance with the following chemical equation:

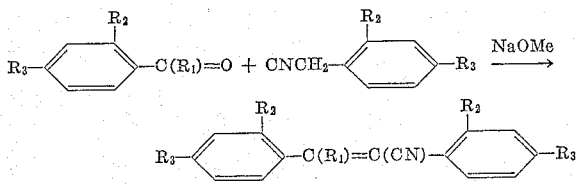

In the above reaction $R_1$, $R_2$ and $R_3$ are defined as aforementioned. If the benzyl cyanide reactant bears a p-tertiary-aminoalkoxy group, then the resultant compound will bear the same group on the benzene nucleus on the same side of the double bond as the cyano group. In contrast, if the tertiary-aminoalkoxy group is on the benzaldehyde reactant, then the resultant compounds will contain the tertiary-aminoalkoxy group on the benzene nucleus on the other side of the double bond from the cyano group. In a similar manner, the naphthyl compounds of this invention, may be prepared by reacting the appropriate β-naphthyl aldehyde or 4-substituted-α-naphthyl aldehyde wherein 4-substituted is defined by the aforementioned $R_4$, with a 2,4-disubstituted benzyl cyanide wherein the 2-substituted position corresponds to the previously defined $R_2$ and $R_3$ is the heretofore defined tertiary-aminoalkoxy.

The starting materials for the above reaction are commercially available or may be readily prepared from the procedures which are well known in the art. The reactants are best employed in approximately equimolecular quantities, although a slight excess, for instance up to about 10% of either reactant, may be used. A greater excess of one reactant, however, is wasteful and complicates the isolation procedures.

The reaction is carried out in the presence of a basic condensation catalyst. The amount employed is not critical. As little as 5% by weight based on the amount of either of the principal reactants can be used and as much as a molar equivalent of catalyst, again based on the amount of either of the principal reactants. Suitable basic condensation catalysts are well known to those skilled in the art. The preferred include sodium methoxide and sodium ethoxide.

The reactants are dissolved in a suitable solvent, such as an alkanol containing up to 5 carbon atoms. Temperatures from about 20° C. to about 100° C. and reaction time of about 10 minutes to about 4 hours have been found admirably suited to produce the best results. While these reaction conditions are not critical, they are interdependent, for instance, the higher the temperature, the shorter the time. The effect of these conditions will be further illustrated in the specific working examples.

The procedure for isolating the desired product from the reaction mixture is not critical. Various procedures will be apparent to those skilled in the art. A particularly useful method which is available for those compounds, within the scope of the application, which form insoluble acid addition salts is to pour the reaction mixture into at least an equal volume of water and to precipitate the acid addition salt by the addition of strong mineral acid, for example, 6 N hydrochloric acid. The precipitated acid addition salt may be isolated by filtration, washed with water and purified by recrystallization. Alternatively, compounds which form soluble acid addition salts can be isolated by adding sufficient aqueous base, for example, 10% sodium hydroxide solution and then extracting the basic solution with an organic solvent such as ether or a halogenated hydrocarbon solvent. The organic layer is dried over anhydrous sodium on magnesium sulfate and the solvent is evaporated in vacuo leaving the desired product as a residue. Recrystallization may be effected from a suitable solvent such as ethanol or isopropanol.

It may be desirable, although not necessary, to extract the acidified aqueous solution containing a water soluble acid addition salt of this invention with an organic solvent before the solution is made basic, thus removing other undesirable organic materials by leaving the desired acid addition salts in the aqueous layer.

Insoluble acid addition salts can be converted to the free base by treatment with an aqueous base, for example, 10% aqueous sodium hydroxide. Isolation of the free base proceeds in accordance with the preceding discussion.

Alternatively, some of the compounds of this invention may be synthesized by reacting an α-(o,p-disubstituted phenyl)-β-(p-hydroxy-o-substituted phenyl)-α-alkenonitrile with diethylaminoethyl chloride to produce a compound of the following formula:

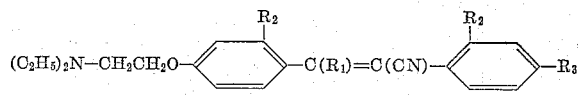

Conversely, other compounds of this invention may be synthesized by reacting an α-(p-hydroxy-o-substituted phenyl)-β-(o,p-disubstituted phenyl)-α-alkenonitrile with diethylaminoethyl chloride to produce a compound of the following formula:

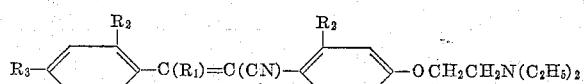

in both formulae $R_1$, $R_2$ and $R_3$ are defined as aforementioned. For the purposes of this specification whenever the word "substituted" is employed in the naming of a reactant or product, it is to be understood it shall refer to substituents herein defined including hydrogen.

This reaction is preferably conducted in the presence of an alkali or alkaline earth carbonate in an inert polar solvent. Temperatures from about 20° C. to reflux temperatures and reaction time of about 4 hours to about 72 hours have been found to produce the best results. The compounds of this invention may be isolated from this reaction mixture in the manner previously described in the prior method of synthesis.

The diethylaminoethyl chloride employed in the aforementioned reaction may be commercially obtained or it may be readily prepared by those skilled in the art. The α-(o,p-disubstituted phenyl)-β-(p-hydroxy-o-substituted phenyl)-α-alkenonitrile employed, as the other starting material is prepared by condensation of an o,p-disubstituted benzyl cyanide with an appropriate 1-(p-alkoxy-o-substituted phenyl)-1-alkanone and, subsequent dealkylation of the resulting compound.

More particularly, by way of example, α-phenyl-β-(p-hydroxyphenyl) pentenonitrile may be produced by slowly adding 33.6 grams of sodium amide to 500 ml. of a boiling xylene solution containing 100.8 grams of phenylacetonitrile. To this mixture p-methoxypropiophenone is added by dropwise addition and the resulting mixture is heated to reflux for approximately 30 minutes. Thereafter, this mixture is cooled and diluted with 500 ml. of water. After the addition of 60 ml. of glacial acetic acid, the two immiscible layers are separated and the aqueous layer extracted several times with ether. The combined ether extracts are dried and the ether removed. The residue is crystallized from 150 ml. of an ether-petroleum ether mixture and 63 grams of crystalline α-phenyl-β-(4-methoxyphenyl)-α-pentenonitrile are obtained. Quantitative paper chromatography showed this product to be a mixture of approximately equal parts of the cis-trans isomers of the aforementioned product.

This mixture of the isomeric methoxy ethers was combined with 282 grams of pyridine hydrochloride and refluxed for one hour. After cooling, this solution was diluted with 500 ml. of water and acidified with 6 N hydrochloric acid. The resulting precipitation was a mixture of the corresponding isomeric phenols. The more polar isomer was isolated by crystallization from methylene chloride. This isomer had a melting point of 167–173° C., and ultraviolet absorption maxima in ethanol at 297.5 mμ

($E_{1\,cm.}^{1\%}$ 524)

a calculated elemental analysis of C, 81.90; H, 6.06; N, 5.62 and an experimentally determined elemental analysis of C, 81.95; H, 6.11; N, 5.58. The homogenicity of this isomer was readily demonstrated by paper chromatography employing a mixture of benzene, cyclohexane and formamide as the eluant.

After the aforementioned isomer is crystallized from methylene chloride, the less polar isomer is easily obtained by subjecting the liquor to chromatography on a Florisil column. The isomer obtained in this manner had a melting point of 123–126° C., an ultraviolet absorption maxima in ethanol at 300 mμ

($E_{1\,cm.}^{1\%}$ 304)

a calculated elemental analysis of C, 71.76; H, 7.59; N, 7.28 and an experimentally determined elemental analysis of C, 71.64; H, 7.62; N, 7.34. The homogenicity of said isomer was demonstrated by the one spot obtained by paper chromatography employing the heretofore mentioned eluant.

For the synthesis of the compounds of this invention either isomer may be employed as the starting alkenonitrile. If the more polar isomer is employed as the starting material, the reaction product will have the sterioconfiguration of the more polar isomer. Conversely, the compounds of this invention will possess the configuration of the less polar isomer if it is employed as the starting material.

The isomers of the other starting phenols employed in the synthesis of the other compounds of this invention may be isolated in the manner described above or by other procedures which are well known to those skilled in the art. Employing a procedure similar to the aforementioned process, the naphthyl compounds of the present invention may also be prepared.

The following examples illustrate the present invention. It will be obvious to those skilled in the art that many variations are possible while remaining within the generic concept of the present invention.

*Example I*

4.64 grams (0.02 mol) of p-diethylaminoethoxybenzyl cyanide and 2.12 grams (0.02 mol) of benzaldehyde were combined in 25 ml. of methanol. The solution was heated to 55° C. Nine milliliters of 1.0 N sodium methoxide in methanol were added to the heated solution, and the solution was stirred for 10 minutes at 55° C. After most of the solvent was removed in vacuo, the rest of the reaction mixture was poured into 25 ml. water at 20° C., resulting in the formation of globules of oil. 6 N HCl was added until the mixture was acidic (approx. pH 2); at this point a clear yellow solution was obtained. The aqueous solution was extracted with 100 ml. ether. The aqueous solution was made alkaline (approx. pH 9) with 10% NaOH and extracted with ether. The ethereal solution was washed with distilled water, filtered through anhydrous $Na_2SO_4$ and concentrated in vacuo. The yield was 5.8 grams of a yellow viscous oil. The oil was dissolved in 50 ml. of methanol and treated with an equal volume of methanolic HCl for 10 minutes; concentration in vacuo produced white crystals. The product was dissolved in 10 ml. methanol; an equal volume of isopropanol was added; the mixture was concentrated to 3 ml. and cooled. The recrystallized product was in the form of white crystals and was α-(p-diethylaminoethoxyphenyl)-β-phenyl-acrylonitrile hydrochloride, which melted at 187–188° C., had an ultraviolet absorption maxima in ethanol at 330.5 mμ and a molar extinction coefficient of 24,350.

*Analysis.*—Calcd. for $C_{21}H_{24}ON_2HCl$: C, 70.67; H, 7.06; N, 7.85. Found: C, 70.84; H, 7.30; N, 7.78.

*Example II*

7.67 grams of diethylaminoethyl chloride, 8.29 grams of potassium carbonate and 7 grams of the isomeric form of α-phenyl-β-(p-hydroxyphenyl)-α-pentenonitrile which had a melting point of 167–173° C., an ultraviolet absorption maxima in ethanol at 297.5 mμ

($E_{1\,cm.}^{1\%}$ 524)

and an elemental analysis of C, 81.95; H, 6.11; N, 5.58, were added to 350 ml. of acetone and heated to reflux temperatures for 23 hours. Thereafter, the reaction mixture was cooled and filtered. The filtrate was evaporated under reduced pressure and the oily residue dissolved in 250 ml. of an aqueous 1 N hydrochloric acid solution. The acidic solution was extracted with two 50 ml. portions of ether, which were then discarded and the acidic, aqueous layer made basic by the addition of 150 ml. of a 20% sodium hydroxide solution. This solution was extracted with four 50 ml. portions of ether and a 50 ml. portion of methylene chloride and the combined extracts were dried over sodium sulfate. Subsequently, the solvent was removed by evaporation and the residual oil dissolved in ethyl acetate solution which was saturated with hydrogen chloride. The solvent was removed under vacuum; the product crystallized from acetone with charcoal treatment. The product was the isomer of α-phenyl-β-(p-diethylaminoethoxyphenyl)-α-pentenonitrile hydrochloride which had a melting point at 172–174° C., an ultraviolet absorption maxima in methanol at 284 mμ

($E_{1\,cm.}^{1\%}$ 365)

*Analysis.*—Calcd. for $C_{23}H_{28}ON_2HCl$: C, 71.76; H, 7.59; N, 7.28. Found: C, 71.65; H, 7.51; N, 7.37.

In a similar manner, the isomeric form of α-(p-hydroxyphenyl)-β-phenyl-α-pentenonitrile, which had a melting point of 175–177° C., an ultraviolet absorption maxima in ethanol at 285 mμ

($E_{1\,cm.}^{1\%}$ 475)

and an elemental analysis of C, 82.12; H, 6.09; N, 5.71, was reacted to produce the isomer of α-(p-diethylaminoethoxyphenyl)-β-(phenyl)-α-pentenonitrile hydrochloride which had a melting point of 152–154° C., an ultraviolet absorption maxima in ethanol at 277 mμ

($E_{1\ cm.}^{1\%}$ 353)

and an elemental analysis of C, 72.03; H, 7.64; N, 7.24.

*Example III*

A mixture of 16.6 g. of potassium carbonate, 15.2 g. of diethylaminoethyl chloride and 16.3 g. of the isomeric form of α-(p-chlorophenyl)-β-(p-hydroxyphenyl)-α-pentenonitrile which had a melting point of 159.5–161.5° C., an ultraviolet absorption maxima in ethanol at 301 mμ

($E_{1\ cm.}^{1\%}$ 492)

and an elemental analysis of C, 71.91; H, 5.02; N, 4.82, was added to 500 ml. of acetone and heated to reflux temperature for 20 hours. Thereafter, the reaction mixture was cooled and filtered to remove any undissolved material. The filtrate was evaporated under reduced pressure and the oily residue dissolved in 350 ml. of an aqueous 1 N hydrochloric acid solution. The acidic solution was extracted with two 75 ml. portions of ether which were then discarded and the acidic, aqueous layer made basic by the addition of 250 ml. of a 20% sodium hydroxide solution. This solution was extracted with four 75 ml. portions of ether and a 75 ml. portion of methylene chloride and the combined extracts were dried over sodium sulfate. Subsequently, the solvent was removed by evaporation and the residual oil dissolved in ethyl acetate solution which was saturated with hydrogen chloride. The solvent was removed under vacuum and the product crystallized from acetone with charcoal treatment. The product was the isomer of α-(p-chlorophenyl)-β-(p-diethylaminoethoxyphenyl)-α-pentenonitrile hydrochloride which had a melting point of 222.5–224° C., an ultraviolet absorption maxima in ethanol at 294 mμ

($E_{1\ cm.}^{1\%}$ 351)

and an elemental analysis of C, 65.60; H, 6.80; N, 6.76.

Similarly, the isomeric form of α-(p-hydroxyphenyl)-β-(p-chlorophenyl)-α-pentenonitrile, which had a melting point of 182–184.5° C., an ultraviolet absorption maxima in ethanol at 289 mμ

($E_{1\ cm.}^{1\%}$ 469)

and an elemental analysis of C, 71.81; H, 5.02; N, 5.18, was reacted to produce the isomer of α-(p-diethylaminoethoxyphenyl)-β-(p-chlorophenyl)-α-pentenonitrile hydrochloride which had a melting point of 141.5–143.5° C., an ultraviolet absorption maxima in ethanol at 284 mμ

($E_{1\ cm.}^{1\%}$ 340)

and an elemental analysis of C, 65.26; H, 6.90; N, 6.67.

*Example IV*

The procedure described in Example I was repeated using other starting materials and reagents in place of those specifically mentioned. For the sake of convenience and in order to avoid unnecessary repetition of experimental detail the compounds prepared in this manner, as well as some of the physical properties including the melting points, the ultraviolet absorption maxima in ethanol and elemental analyses are listed below.

| Compound | Analyses | | Melting Point, ° C. | λ ETOH max. (mμ) | Molar Extinction Coefficient |
|---|---|---|---|---|---|
| | Calc. | Found | | | |
| α-(phenyl)-β-(p-diethylaminoethoxyphenyl) acrylonitrile hydrochloride. | C 70.67<br>H 7.06<br>N 7.85 | C 70.81<br>H 6.83<br>N 7.91 | 174–177 | 335 | 23,600 |
| α-(p-diethylaminoethoxyphenyl)-β-(p-chlorophenyl)-acrylonitrile hydrochloride. | C 64.45<br>H 6.19<br>N 7.17 | C 64.53<br>H 5.93<br>N 7.01 | 211–212 | 337 | 25,600 |
| α-(p-chlorophenyl)-β-(p-diethylaminoethoxyphenyl)-acrylonitrile hydrochloride. | C 64.45<br>H 6.19<br>N 7.17 | C 64.39<br>H 6.36<br>N 7.20 | 209–211 | 339.5 | 32,000 |
| α-(p-diethylaminoethoxyphenyl)-β-(o-chlorophenyl)-acrylonitrile hydrochloride. | C 64.45<br>H 6.19<br>N 7.17 | C 64.51<br>H 6.19<br>N 7.34 | 175.3–176.8 | 328 | 19,900 |
| α-(p-fluorophenyl)-β-(p-diethylaminoethoxy phenyl)-acrylonitrile hydrochloride. | C 67.28<br>H 6.45<br>N 7.47 | C 67.23<br>H 6.56<br>N 7.28 | 204–206 | 337 | 28,400 |
| α-(p-diethylaminoethoxyphenyl)-β-(p-methoxyphenyl)-acrylonitrile hydrochloride. | C 68.28<br>H 7.03<br>N 7.24 | C 68.67<br>H 7.12<br>N 7.05 | 177.5–178.5 | 337 | 30,600 |
| α-(p-methoxyphenyl)-β-(p-diethylaminoethoxyphenyl) acrylonitrile dihydrogen citrate. | C 61.98<br>H 6.32<br>N 5.16 | C 61.25<br>H 6.42<br>N 4.94 | 127–130 | 344 | 25,500 |
| α-(p-diethylaminoethoxyphenyl)-β-(p-diethylaminoethoxyphenyl) acrylonitrile dihydrochloride. | C 63.77<br>H 7.73<br>N 8.27 | C 63.39<br>H 7.80<br>N 8.86 | 187–188.5 | 343.5 | 31,800 |
| α-(p-diethylaminoethoxyphenyl)-β-(p-hydroxyethoxyphenyl) acrylonitrile hydrochloride. | C 66.25<br>H 7.01<br>N 6.72 | C 66.09<br>H 6.96<br>N 6.82 | 152–153 | 346 | 30,500 |
| α-(p-diethylaminoethoxyphenyl)-β-(p-methylmercaptophenyl) acrylonitrile hydrochloride. | C 65.56<br>H 6.75<br>N 6.95 | C 65.82<br>H 6.84<br>N 7.05 | 207.5–209 | 360 | 33,550 |
| α-(p-diethylaminoethoxy)-β-(p-benzylmercaptophenyl) acrylonitrile hydrochloride. | C 70.19<br>H 6.52<br>N 5.85 | C 69.44<br>H 6.44<br>N 5.61 | 194.5–195.5 | 357.5 | 34,600 |
| α-(p-diethylaminoethoxyphenyl)-β-(p-isopropylmercaptophenyl) acrylonitrile. | C 73.04<br>H 7.67<br>N 7.10 | C 73.23<br>H 7.73<br>N 7.23 | 68–69 | 355 | 30,200 |
| α-(p-diethylaminoethoxyphenyl)-β-(p-dimethylaminophenyl) acrylonitrile dihydrochloride. | C 63.30<br>H 7.17<br>N 9.64 | C 63.50<br>H 7.26<br>N 9.51 | 201.5–203.5 | 395 | 38,300 |
| α-(p-nitrophenyl)-β-(p-diethylaminoethoxyphenyl) acrylonitrile. | C 69.02<br>H 6.34<br>N 11.50 | C 68.82<br>H 6.45<br>N 11.23 | 111–113 | 368 | 29,500 |
| α-(p-diethylaminoethoxyphenyl)-β-(p-trifluoromethylphenyl) acrylonitrile. | C 68.03<br>H 5.98<br>N 7.22 | C 68.39<br>H 6.10<br>N 7.23 | 72–74 | 337 | 22,900 |
| α-(p-diethylaminoethoxyphenyl)-β-(1-napthyl) acrylonitrile hydrochloride. | C 73.76<br>H 6.69<br>N 6.88 | C 73.81<br>H 6.64<br>N 7.13 | 191–192.5 | 345 | 18,450 |
| α-(p-diethylaminoethoxyphenyl)-β-(2-naphthyl) acrylonitrile hydrochloride. | C 73.76<br>H 6.69<br>N 6.88 | C 73.62<br>H 6.48<br>N 7.03 | 223–224 | 348 | 33,400 |
| α-(p-diethylaminoethoxyphenyl)-β-(p-isopropylmercaptophenyl) acrylonitrile hydrochloride. | C 66.88<br>H 7.25<br>N 6.50 | C 66.64<br>H 7.36<br>N 5.96 | 171–173 | 356 | 32,650 |

Example V

The procedure described in Example I can be used with still other starting materials and reagents to prepare additional compounds. Thus obtained in this manner are the compounds listed below:

(1) α-(o-fluorophenyl)-β-(p-diethylaminopropoxyphenyl)-α-butenonitrile hydrochloride
(2) α-(p-diethylaminoethoxyphenyl)-β-(p-tolyl)-acrylonitrile hydrochloride
(3) α-(p-nitrophenyl)-β-(p-dimethylaminoethoxyphenyl)-α-hexenonitrile hydrochloride
(4) α-(o-bromophenyl)-β-(p-methylethylaminoethoxyphenyl)-α-butenonitrile hydrochloride
(5) α-(p-isopropylphenyl)-β-(p-dipropylaminoethoxyphenyl)-acrylonitrile dihydrogen citrate
(6) α-(p-diethylaminoethoxyphenyl)-β-(p-dimethylaminobutoxyphenyl)-acrylonitrile hydrochloride
(7) α-(p-diethylaminoethoxyphenyl)-β-(p-diethylaminoethoxyphenyl)-α-butenonitrile dihydrochloride
(8) α-(p-ethylbutylaminoethoxyphenyl)-β-[p-(iso)propoxyphenyl]-α-hexenonitrile hydrochloride
(9) α-(p-iodophenyl)-β-(p-propylbutylaminoethoxyphenyl)-α-heptenonitrile hydrochloride
(10) α-(p-ethoxyphenyl)-β-(p-ethylpropylaminobutoxyphenyl) acrylonitrile monohydrogen tartrate
(11) α-(p-dipropylaminoethoxy)-β-(p-diethylaminopropoxyphenyl)-α-pentenonitrile hydrochloride
(12) α-(p-hydroxybutoxyphenyl)-β-(p-diethylaminoethoxyphenyl)-α-heptenonitrile hydrochloride
(13) α-[p-(3-diethylamino-2-methylpropoxyphenyl)]-β-phenyl-α-butenonitrile hydrobromide
(14) α-[p-(4-diethylamino-2,3-diethylbutoxyphenyl)]-β-(p-chlorophenyl)-α-pentenonitrile hydrochloride

Example VI

The procedure in Example I is again repeated with other starting material to produce the following compounds.
(1) α-(p-dimethylaminoethoxyphenyl)-β-(p-hydroxyethoxyphenyl)-α-hexenonitrile monohydrogen maleate
(2) α-(p-diethylaminoethoxyphenyl)-β-(p-phenylbutylmercaptophenyl) acrylonitrile hydrochloride
(3) α-(p-morpholinoethoxyphenyl)-β-(p-butylthiophenyl)-α-pentenonitrile hydrochloride
(4) α-(p-butoxyphenyl)-β-(p-pyrrolidinopropoxyphenyl)acrylonitrile hydrochloride
(5) α-(p-piperidinobutoxyphenyl)-β-(p-butylphenyl)-α-pentenonitrile hydrochloride
(6) α-(p-propylphenyl)-β-(p-dibutylaminoethoxyphenyl)α-butenonitrile hydrochloride
(7) α-(p-methylethylaminoethoxyphenyl)-β-(p-chlorophenyl)-β-phenyl acrylonitrile hydrochloride
(8) α-(4-chloro-1-naphthyl)-β-(p-diethylaminopropoxyphenyl) acrylonitrile hydrochloride
(9) α-(4-trifluoromethyl-1-naphthyl)-β-(p-dimethylaminoethoxyphenyl) acrylonitrile hydrochloride
(10) α-(p-methylethylaminoethoxyphenyl)-β-(4-iodo-1-naphthyl)-α-pentenonitrile hydrochloride
(11) α-(2-naphthyl)-β-(o-bromo-p-diethylaminoethoxyphenyl) acrylonitrile hydrochloride
(12) α-(p-dipropylaminoethoxyphenyl)-β-(4-fluoro-1-naphthyl)α-butenonitrile hydrochloride
(13) α-(4-iodo-1-naphthyl)-β-(diethylaminoethoxyphenyl) acrylonitrile hydrochloride
(14) α-(p-hydroxybutoxyphenyl)-β-(p-dimethylaminoethoxyphenyl)-α-butenonitrile hydrobromide

Example VII

The non-toxic addition salts of these alkenonitriles are prepared by dissolving the acid of the corresponding hydrochloride, nitrate, sulfate and phosphate salt and the respective alkenonitrile separately in ethanol. The two solutions are then mixed, followed by the addition of acetone to the reaction mixture in order to effect precipitation of the desired acid addition salt.

In this manner, equimolar amounts of α-(phenyl)-β-(p-diethylaminoethoxyphenyl)-acrylonitrile and hydrochloric acid react to form the corresponding acid addition salt.

Example VIII

A dry solid pharmaceutical composition is prepared by blending the following materials in the proportions by weight specified below:

| | |
|---|---:|
| α-phenyl-β-(p-diethylaminoethoxyphenyl)-α-pentenonitrile hydrochloride | 50 |
| Sodium citrate | 25 |
| Alginic acid | 10 |
| Polyvinylpyrrolidone | 10 |
| Magnesium stearate | 5 |

After the dried composition is thoroughly blended, tablets are punched from the resulting mixture, each tablet being of such size that is contains 100 mg. of the active ingredient.

Example IX

A dry solid pharmaceutical composition is prepared by combining the following materials in the proportions by weight specified below:

| | |
|---|---:|
| α-phenyl-β-(p-diethylaminoethoxyphenyl)-α-pentenonitrile hydrochloride | 50 |
| Calcium carbonate | 20 |
| Polyethylene glycol (average molecular weight, 4000) | 30 |

The solid mixture so prepared is thoroughly blended and then packed into gelatin capsules. A sufficient quantity of the blend is incapsulated to furnish 250 mg. of active ingredient in each capsule.

Example X

A dilute aqueous levulose solution of α-phenyl-β-(p-diethylaminophenyl)-α-pentenonitrile hydrochloride may be prepared by dissolving said salt in a 50% aqueous levulose solution in such amount that each ml. of solution contains 75 mg. of the active component. This solution can then be sweetened and flavored as desired in order to mask the taste of the essential active ingredient. This solution is rendered more viscous by the addition of the appropriate amount of methyl cellulose.

What is claimed is:
1. A compound selected from the group consisting of those having the formulae:

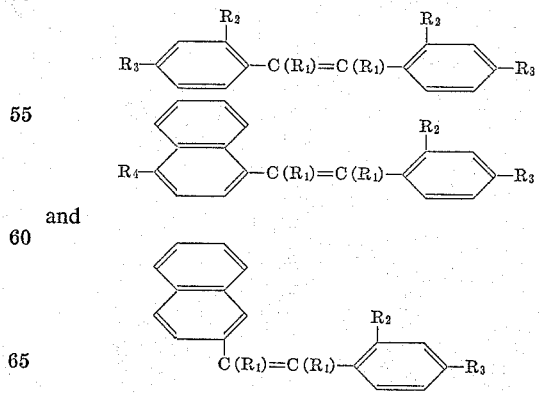

and wherein
one $R_1$ is selected from the group consisting of hydrogen, phenyl and alkyl having from one to four carbon atoms, and the other $R_1$ is cyano;
$R_2$ is selected from the group consisting of hydrogen and halo, at least one $R_2$ in the first formula being hydrogen;
$R_3$ is selected from the group consisting of hydrogen, trifluoromethyl, halo, nitro, lower-alkyl, lower alkoxy, hydroxy-(lower)-alkoxy, aryl-(lower)-alkylmercapto, lower-alkylmercapto, di-(lower)-alkylamino, di-(lower)-alkylamino-Alk-O, pyrrolidino - Alk-O, piperidino-Alk-O and morpholino-Alk-O, Alk in each case being a lower alkylene chain containing up to 8 carbon atoms of which 2 to 4 are in the straight chain, at least one $R_3$ being a member selected from the group consisting of di-(lower)-alkylamino-Alk-O, pyrrolidino-Alk-O, piperidino-Alk-O and morpholino-Alk-O;

$R_4$ is selected from the group consisting of hydrogen, trifluoromethyl and halo; and the salts thereof with pharmaceutically acceptable acids.

2. The isomer of α-phenyl-β-(p-diethylaminoethoxyphenyl)-α-pentenonitrile hydrochloride which has a melting point of 172–174° C., an ultraviolet absorption maxima in ethanol at 290.5 mμ

$$(E_{1\,cm.}^{1\%}\ 373)$$

an ultraviolet absorption maxima in methanol at 284 mμ

$$(E_{1\,cm.}^{1\%}\ 365)$$

and Rf value of approximately 0.7 when the isomer is chromatographed on paper employing an isooctane-dimethylformamide eluant and an elemental analysis of C, 71.65; H, 7.51; N, 7.37.

3. The isomer of α-(p-chlorophenyl)-β-(p-diethylaminoethoxyphenyl)-α-pentenonitrile hydrochloride which has a melting point of 222.5–224° C., and ultraviolet absorption maxima in ethanol at 294 mμ

$$(E_{1\,cm.}^{1\%}\ 351)$$

and an elemental analysis of C, 65.50; H, 6.80; N, 6.76.

4. The isomer of α-(p-diethylaminoethoxyphenyl)-β-phenyl-α-pentenonitrile hydrochloride which has a melting point of 152–154° C., an ultraviolet absorption maxima in ethanol at 277 mμ

$$(E_{1\,cm.}^{1\%}\ 353)$$

and an elemental analysis of C, 72.03; H, 7.64; N, 7.24.

5. The isomer of α-(p-diethylaminoethoxyphenyl)-β-(p-chlorophenyl)-α-pentenonitrile hydrochloride which has a melting point of 141.5–143.5° C., an ultraviolet absorption maxima in ethanol at 284 mμ

$$(E_{1\,cm.}^{1\%}\ 340)$$

and an elemental analysis of C, 65.26; H, 6.90; N, 6.67.

References Cited in the file of this patent

Cavallini et al.: Chemical Abstracts, 1950, vol. 44, 748.
Merck: Bulletin Societe Chimiques Belges, vol. 58, pages 460–471, 1949.